(12) United States Patent
Kikkawa et al.

(10) Patent No.: US 10,918,466 B2
(45) Date of Patent: Feb. 16, 2021

(54) BASE PORTION, INTER-DENTAL CLEANING TOOL, AND METHOD OF MANUFACTURING INTER-DENTAL CLEANING TOOL

(71) Applicant: KOBAYASHI PHARMACEUTICAL CO., LTD., Osaka (JP)

(72) Inventors: Tasuku Kikkawa, Ibaraki (JP); Shinji Yuumei, Toyama (JP)

(73) Assignee: KOBAYASHI PHARMACEUTICAL CO., LTD., Osaka (JP)

( * ) Notice: Subject to any disclaimer, the term of this patent is extended or adjusted under 35 U.S.C. 154(b) by 311 days.

(21) Appl. No.: 15/755,267

(22) PCT Filed: Aug. 26, 2016

(86) PCT No.: PCT/JP2016/074897
§ 371 (c)(1),
(2) Date: Feb. 26, 2018

(87) PCT Pub. No.: WO2017/038654
PCT Pub. Date: Mar. 9, 2017

(65) Prior Publication Data
US 2018/0256298 A1    Sep. 13, 2018

(30) Foreign Application Priority Data

Aug. 28, 2015  (JP) .............................. JP2015-168799

(51) Int. Cl.
*A61C 15/00* (2006.01)
*A61C 15/02* (2006.01)
(Continued)

(52) U.S. Cl.
CPC .............. *A61C 15/02* (2013.01); *A46B 3/005* (2013.01); *A46B 15/0093* (2013.01);
(Continued)

(58) Field of Classification Search
CPC ......... A61C 15/00; A61C 15/02; A46B 3/005; A46B 15/0093; A46B 2200/108
See application file for complete search history.

(56) References Cited

U.S. PATENT DOCUMENTS 1,746,591 A * 2/1930 Heymann .............. A61C 15/02
132/329
2015/0114428 A1   4/2015 Kato
(Continued)

FOREIGN PATENT DOCUMENTS

DE   202009009283 U1   10/2009
DE   102013010782 A1   12/2014
(Continued)

OTHER PUBLICATIONS

International Search Report for International Application No. PCT/JP2016/074897 dated Oct. 18, 2016 (1 Sheet).
(Continued)

*Primary Examiner* — Rachel R Steitz
(74) *Attorney, Agent, or Firm* — Kratz, Quintos & Hanson, LLP

(57) ABSTRACT

[Problem] To provide a base part, an interdental cleaning tool, and a method for manufacturing the interdental cleaning tool, capable of preventing bending of a shaft part when a resin material is filled from an insertion end. [Solution] A base part includes a shaft part (20) and a grip part (30). The base part is used for forming an interdental cleaning tool by filling, inside a metal mold having a shape that forms a filling space around the shaft part (20), a resin material into the filling space with the shaft part (20) clamped by a holding pin. The shaft part (20) includes a first guide groove (24) formed on one side with respect to an axially parallel plane and a second guide groove (26) formed on the other side with respect to the axially parallel plane. The first guide groove (24) and the second guide groove (26) extend in the
(Continued)

axial direction from an insertion end (22a) toward a base end and have a shape recessed toward the center of the shaft part (20) from the outer peripheral face of a region other than the first guide groove (24) and the second guide groove (26) in the shaft part (20).

7 Claims, 6 Drawing Sheets

(51) Int. Cl.
  *A46B 3/00* (2006.01)
  *A46B 15/00* (2006.01)
  *B29C 45/14* (2006.01)
  *B29C 45/16* (2006.01)
(52) U.S. Cl.
  CPC ... *A46B 2200/108* (2013.01); *B29C 45/14065* (2013.01); *B29C 45/1676* (2013.01)

(56) References Cited

U.S. PATENT DOCUMENTS

| | | | |
|---|---|---|---|
| 2015/0257861 A1* | 9/2015 | Dishon | A46D 3/00 132/329 |
| 2016/0135932 A1 | 5/2016 | Butz | |
| 2017/0189148 A1 | 7/2017 | Kato | |

FOREIGN PATENT DOCUMENTS

| | | |
|---|---|---|
| EP | 2829253 A1 | 1/2015 |
| JP | 2013-192866 A | 9/2013 |
| WO | 2013/176297 A1 | 11/2013 |

OTHER PUBLICATIONS

Extended European Search Report for European Patent Application No. 16841686.5 dated May 21, 2019 (13 pages).

* cited by examiner

BASE PORTION, INTER-DENTAL CLEANING TOOL, AND METHOD OF MANUFACTURING INTER-DENTAL CLEANING TOOL

TECHNICAL FIELD

The present invention relates to an interdental cleaning tool.

BACKGROUND ART

There has been conventionally known an interdental cleaning tool for cleaning an interdental space. For example, Patent Literature 1 discloses an interdental cleaning tool including a base part having a shape extending in a specific direction and a cleaning part made of a resin material (elastomer). The base part includes a shaft part having a shape insertable into an interdental space and a grip part having a shape grippable with fingers. The shaft part has an insertion end formed on one end thereof and a base end formed on the other end thereof. The grip part is connected to the base end. The cleaning part has a shape covering a part (including the insertion end) of the outer peripheral face of the shaft part.

The interdental cleaning tool is manufactured through a base part forming step and a cleaning part forming step. In the base part forming step, the base part is formed by pouring a synthetic resin (e.g., polypropylene) into a metal mold that has a space having a shape corresponding to the base part. In the subsequent cleaning part forming step, the cleaning part is formed by filling a filling space with a resin material (elastomer) with the base part held by a metal mold having a shape that forms the filling space fillable with the resin material around the shaft part when the metal mold holds the base part. In the cleaning part forming step, the resin material is filled from the insertion end (leading end) of the shaft part with the shaft part clamped by a pair of holding pins from both sides in a direction perpendicular to the axial direction of the shaft part.

CITATION LIST

Patent Literature

Patent Literature 1: WO 2013/176297 A

SUMMARY OF INVENTION

Problems to be Solved by the Invention

In the method for manufacturing the interdental cleaning tool as described in Patent Literature 1, the thickness of the cleaning part may become nonuniform due to bending of the shaft part during the filling of the resin material in the cleaning part forming step. Specifically, in the cleaning part forming step, although the shaft part is clamped by the pair of holding pins, the shaft part is bent in such a manner that the insertion end displaces with respect to the base end in a direction perpendicular to a direction of a clamping force that is applied to the shaft part from each of the holding pins, which may result in nonuniformity in the amount of the resin material filled around the shaft part (the thickness of the cleaning part).

It is an object of the present invention to provide a base part, an interdental cleaning tool, and a method for manufacturing the interdental cleaning tool, capable of preventing bending of a shaft part when a resin material is filled from an insertion end.

Means for Solving the Problems

It is considered that bending of the shaft part during the filling of the resin material into the filling space occurs due to a difference between the pressure in a space located on one side with respect to a plane parallel to both of a direction connecting the pair of holding pins to each other and the axial direction of the shaft part and the pressure in a space located on the other side in the filling space. The inventors of the present invention have made intensive studies and found out that the pressure difference occurs due to a difference between the amount of resin material in the space located on the one side and the amount of resin material in the space located on the other side, the amount difference being caused by a displacement of the resin material in the circumferential direction of the shaft part during the filling of the resin material in the axial direction of the shaft part. Thus, the inventors of the present invention have conceived that it is possible to prevent bending of the shaft part caused by the pressure difference by restricting the displacement of the resin material in the circumferential direction during the filling of the resin material into the filling space, in other words, by guiding the resin material so as to be filled in the axial direction.

The present invention has been made from the above viewpoint. Specifically, the present invention provides a base part including: a shaft part extending in a specific direction and having a shape insertable into an interdental space, the shaft part having an insertion end formed on one end in the specific direction and a base end formed on the other end in the specific direction; and a grip part extending in the specific direction from the base end in a manner to separate from the shaft part and having a shape grippable with fingers, the base part being used for forming an interdental cleaning tool by filling, inside a metal mold having a shape that forms a filling space fillable with a resin material for forming a cleaning part around the shaft part, the resin material into the filling space from the insertion end of the shaft part with the shaft part clamped by a holding pin, wherein the shaft part includes a first guide groove formed on one side with respect to an axially parallel plane, the axially parallel plane including a center of the shaft part and being parallel to the specific direction, and a second guide groove formed on the other side with respect to the axially parallel plane, and the first guide groove and the second guide groove extend in an axial direction of the shaft part from the insertion end toward the base end and have a shape recessed toward the center of the shaft part from an outer peripheral face of a region other than the first guide groove and the second guide groove in the shaft part.

In the base part, when the resin material is filled into the filling space of the metal mold from the insertion end with a region of the outer peripheral face of the shaft part clamped by the holding pin, the region intersecting the axially parallel plane, the resin material flows in the axial direction while being guided by the first guide groove on one side with respect to the axially parallel plane, and the resin material flows in the axial direction while being guided by the second guide groove on the other side with respect to the axially parallel plane in the filling space. Thus, a displacement of the resin material in the circumferential direction of the shaft part is prevented at both sides across the axially parallel plane. Thus, a difference between the pressure in a space located on one side with respect to the axially parallel plane and the pressure in a space located on the other side with respect to the axially parallel plane in the filling space is less likely to occur. Accordingly, bending of the shaft part during the filling of the resin material is prevented. Thus, formation of the cleaning part having a nonuniform thickness (a molding failure of the interdental cleaning tool) is prevented, which improves yields.

In this case, preferably, the first guide groove and the second guide groove are formed at symmetric positions with respect to the axially parallel plane as a symmetry plane.

With this configuration, a pressure is uniformly applied to the shaft part from the resin material in a direction perpendicular to an application direction of the clamping force to the shaft part by the holding pin. Thus, it is possible to more reliably prevent bending of the shaft part.

Further, in the present invention, preferably, a ratio of a depth dimension of the first guide groove to an outer diameter of the insertion end and a ratio of a depth dimension of the second guide groove to the outer diameter of the insertion end are set to 0.018 or more and 0.273 or less.

With this configuration, it is possible to make effective guiding of the resin material along each of the guide grooves compatible with ensuring of the strength of the shaft part. Specifically, the displacement of the resin material in the circumferential direction when the resin material comes into contact with the insertion end is sufficiently restricted by setting the ratio to 0.018 or more. Thus, the resin material is effectively guided along each of the guide grooves. Further, the cross-sectional area of the shaft part, that is, the strength of the shaft part is sufficiently ensured by setting the ratio to 0.273 or less. Further, the dimension in the circumferential direction of the outer peripheral face of the shaft part other than each of the guide grooves is sufficiently ensured by setting the ratio to 0.273 or less. Thus, it is possible to stably clamp the shaft part by the holding pin.

Further, in the present invention, preferably, the first guide groove and the second guide groove have a curved shape projecting toward the center of the shaft part.

With this configuration, it is possible to more reliably prevent the occurrence of the pressure difference. Specifically, due to the curved shape of each of the guide grooves, the occurrence of entrapped air in each of the guide grooves during the filling of the resin material is reduced compared to a case in which each of the guide grooves has a corner. Thus, the pressure difference caused by the occurrence of entrapped air is prevented, which prevents bending of the shaft part.

Further, in the present invention, preferably, the shaft part includes a held part to be held by the metal mold, the held part extending from a groove forming part toward the base end in the shaft part, the groove forming part including the first guide groove and the second guide groove, and the held part has an outer diameter larger than an outer diameter of the groove forming part.

With this configuration, it is possible to prevent a thin film from being formed on the shaft part after the filling of the resin material while preventing bending of the shaft part during the filling of the resin material. Specifically, when the resin material is filled with the held part held by the metal mold, the resin material is received by the boundary (the end face of the held part) between the groove forming part and the held part. Thus, it is possible to prevent a thin film made of the resin material from being formed on the shaft part due to leakage of the resin material toward the base end through a gap between the metal mold and the outer peripheral face of the held part.

The present invention provides an interdental cleaning tool including the base part and the cleaning part, wherein the cleaning part is formed of a material, as the resin material, having a hardness lower than a hardness of the shaft part and has a shape covering an outer peripheral face of a region including the insertion end and having a dimension equal to or less than a dimension in the axial direction of the shaft part, and a thickness of an overlap part of the cleaning part, the overlap part overlapping the first guide groove and the second guide groove in an axially perpendicular direction perpendicular to an axial direction of the shaft part, is set to be larger than a thickness of a non-overlap part of the cleaning part other than the overlap part.

In the interdental cleaning tool, an elastic force in the overlap part is larger than an elastic force in the non-overlap part. Thus, the insertability of the cleaning part into an interdental space is improved.

In this case, preferably, the cleaning part includes a cleaning part body including the overlap part and the non-overlap part and having a circular section on a plane perpendicular to the axial direction, and a plurality of brush bristles each having a shape projecting outward in the axially perpendicular direction from an outer peripheral face of the cleaning part body, and each of the brush bristles is formed at a position that overlaps the overlap part in the axially perpendicular direction.

With this configuration, it is possible to effectively clean an interdental space while ensuring the insertability of the cleaning part into the interdental space. Specifically, since each of the brush bristles is formed at the position that overlaps the overlap part in the axially perpendicular direction, in other words, the thickness of the overlap part which corresponds to a region supporting each of the brush bristles is sufficiently large, each of the brush bristles is easily elastically deformed. Thus, it is possible to effectively clean an interdental space while ensuring the insertability of the cleaning part into the interdental space.

Further, the present invention provides a method for manufacturing an interdental cleaning tool, the method including: a base part preparing step of preparing a base part including a shaft part extending in a specific direction and having a shape insertable into an interdental space, the shaft part having an insertion end formed on one end in the specific direction and a base end formed on the other end in the specific direction, and a grip part extending in the specific direction from the base end in a manner to separate from the shaft part and having a shape grippable with fingers; and a cleaning part forming step of forming a cleaning part capable of cleaning an interdental space around the shaft part by filling a resin material into a filling space with the base part held by a metal mold capable of holding the base part and having a shape that forms the filling space fillable with the resin material around the shaft part when the metal mold holds the base part, wherein in the base part preparing step, the base part is prepared in which the shaft part includes a first guide groove formed on one side with respect to an axially parallel plane including a center of the shaft part and being parallel to the specific direction, and a second guide groove formed on the other side with respect to the axially parallel plane, the first guide groove and the second guide groove extending in an axial direction of the shaft part from the insertion end toward the base end and having a shape recessed toward the center of the shaft part from an outer peripheral face of a region other than the first guide groove and the second guide groove in the shaft part, and in the cleaning part forming step, the resin material is filled into the filling space in such a manner that the resin material flows along the first guide groove and the second guide groove from the insertion end with a region of the outer peripheral face of the shaft part clamped by a holding pin, the region intersecting the axially parallel plane, inside the metal mold.

In the above manufacturing method, in the cleaning part forming step, the resin material flows in the axial direction while being guided by the first guide groove on one side with respect to the axially parallel plane, and the resin material flows in the axial direction while being guided by the second guide groove on the other side with respect to the axially parallel plane in the filling space. Thus, a displacement of the resin material in the circumferential direction of the shaft part is prevented at both sides across the axially parallel plane. Thus, a difference between the pressure in a space located on one side with respect to the axially parallel plane in the filling space and the pressure in a space located on the other side with respect to the axially parallel plane in the filling space is less likely to occur. Accordingly, bending of the shaft part during the filling of the resin material is prevented. Thus, formation of the cleaning part having a nonuniform thickness (a molding failure of the interdental cleaning tool) is prevented, which improves yields.

In this case, preferably, in the base part preparing step, the base part is prepared in which the first guide groove and the second guide groove are formed at symmetric positions with respect to the axially parallel plane as a symmetry plane.

Further, in the above manufacturing method, preferably, in the base part preparing step, the base part is prepared in which a ratio of a depth dimension of the first guide groove to an outer diameter of the insertion end and a ratio of a depth dimension of the second guide groove to the outer diameter of the insertion end are set to 0.018 or more and 0.273 or less.

Further, in the above manufacturing method, preferably, in the base part preparing step, the base part is prepared in which the first guide groove and the second guide groove have a curved shape projecting toward the center of the shaft part.

Further, in the above manufacturing method, preferably, in the base part preparing step, the base part is prepared in which the shaft part includes a held part to be held by the metal mold, the held part extending toward the base end from a groove forming part including the first guide groove and the second guide groove in the shaft part, and in the cleaning part forming step, the resin material is filled with the held part held by the metal mold.

Further, in the above manufacturing method, preferably, in the cleaning part forming step, the metal mold having a shape that expands the filling space from the insertion end toward the base end when the metal mold holds the base part is used.

With this configuration, the pressure applied to the shaft part from the resin material filled in the filling space in the direction perpendicular to the application direction of the clamping force by the holding pin gradually decreases from the insertion end toward the base end. Thus, bending of the shaft part during the filling of the resin material in the cleaning part forming step is more reliably prevented.

Further, in the above manufacturing method, preferably, in the cleaning part forming step, the metal mold including a cleaning part body forming part and a brush bristle forming part is used, the cleaning part body forming part forming a cleaning part body having a circular section on a plane perpendicular to the axial direction, the brush bristle forming part forming a plurality of brush bristles each having a shape projecting outward in an axially perpendicular direction perpendicular to the axial direction of the shaft part from an outer peripheral face of the cleaning part body, and the resin material is filled with the base part held by the metal mold in such a manner that the brush bristle forming part overlaps the first guide groove in the axially perpendicular direction and the brush bristle forming part overlaps the second guide groove in the axially perpendicular direction.

With this configuration, it is possible to manufacture the interdental cleaning tool having a high insertability into an interdental space and capable of effectively cleaning the interdental space.

Effect of the Invention

As described above, according to the present invention, it is possible to provide a base part, an interdental cleaning tool, and a method for manufacturing the interdental cleaning tool, capable of preventing bending of a shaft part when a resin material is filled from an insertion end.

DESCRIPTION OF EMBODIMENTS

Figure 1:
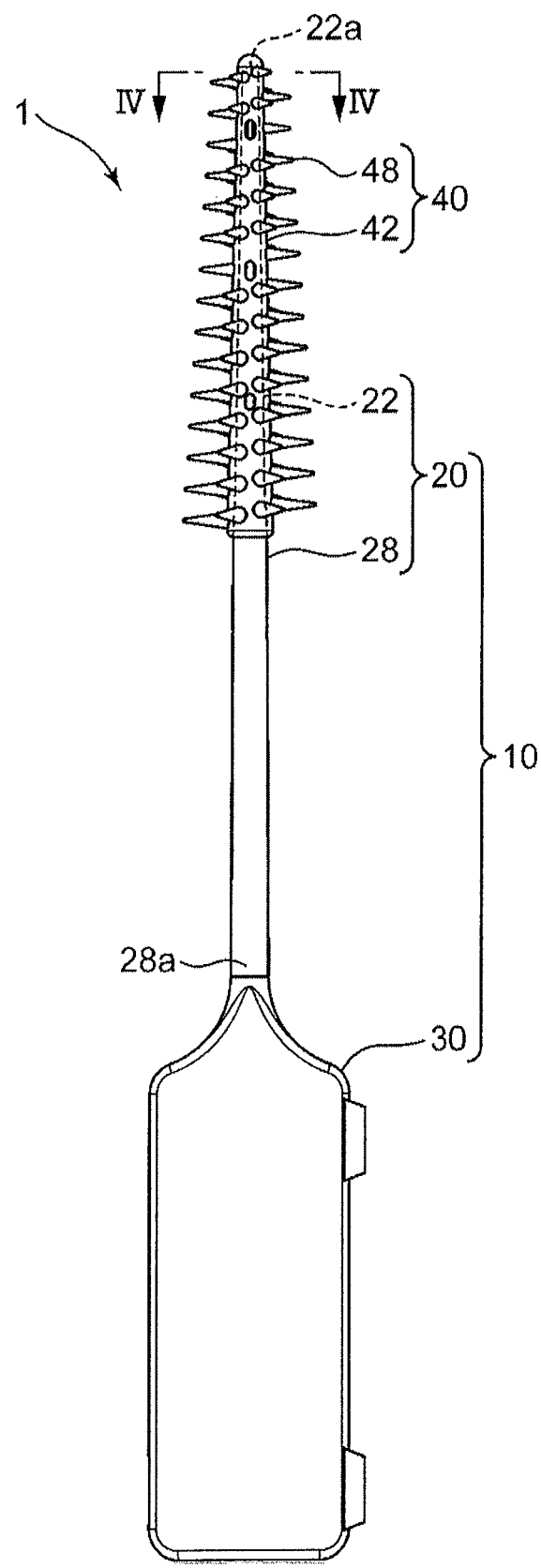
FIG. 1 is a front view of an interdental cleaning tool according to an embodiment of the present invention.

An interdental cleaning tool 1 according to an embodiment of the present invention will be described with reference to FIGS. 1 to 4. The interdental cleaning tool 1 includes a base part 10 and a cleaning part 40.

The base part 10 is formed of a synthetic resin such as polypropylene, polyethylene, ABS, polybutylene terephthalate, polycarbonate, polyethylene terephthalate, polystyrene, or polyacetal. In the present embodiment, the base part 10 is formed of polypropylene. The base part 10 includes a shaft part 20 and a grip part 30.

The shaft part 20 extends in a specific direction (an up-down direction in FIG. 1) and has a shape insertable into an interdental space. An insertion end 22a is formed on one end (an upper end in FIG. 1) of the shaft part 20, and a base end 28a is formed on the other end (a lower end in FIG. 1) of the shaft part 20. The shaft part 20 includes a groove forming part 22 including the insertion end 22a and a held part 28 including the base end 28a.

Figure 2:
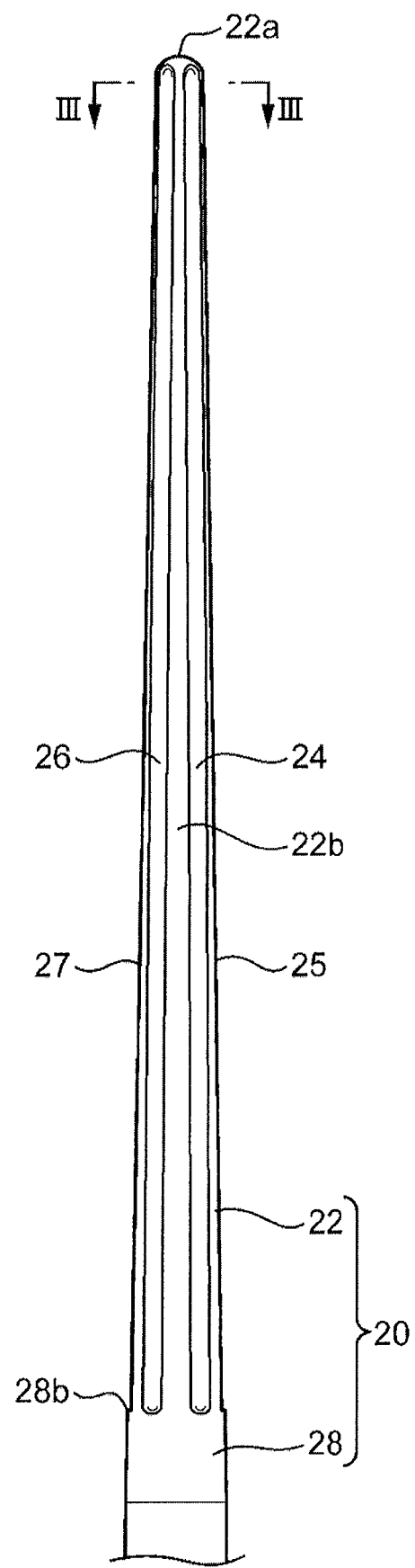
FIG. 2 is an enlarged view of a shaft part of the interdental cleaning tool illustrated in FIG. 1.

As illustrated in FIG. 2, a plurality of (two in the present embodiment) first guide grooves 24 and a plurality of (two in the present embodiment) second guide grooves 26 are formed on the outer peripheral face of the groove forming part 22. Each of the first guide grooves 24 and each of the second guide grooves 26 extend in an axial direction of the shaft part 20 from the insertion end 22a toward the base end 28a and have a shape recessed toward the center of the shaft part 20 from the outer peripheral face of the shaft part 20 (groove forming part 22) in a region other than the first guide grooves 24 and the second guide grooves 26. Specifically, each of the guide grooves 24, 26 has a curved shape projecting toward the center of the shaft part 20. The depth dimension of each of the guide grooves 24, 26 is preferably set to 0.01 mm to 0.15 mm, and more preferably set to 0.03 mm to 0.07 mm. In the present embodiment, the depth dimension of each of the guide grooves 24, 26 is set to 0.04 mm to 0.05 mm.

Figure 3:
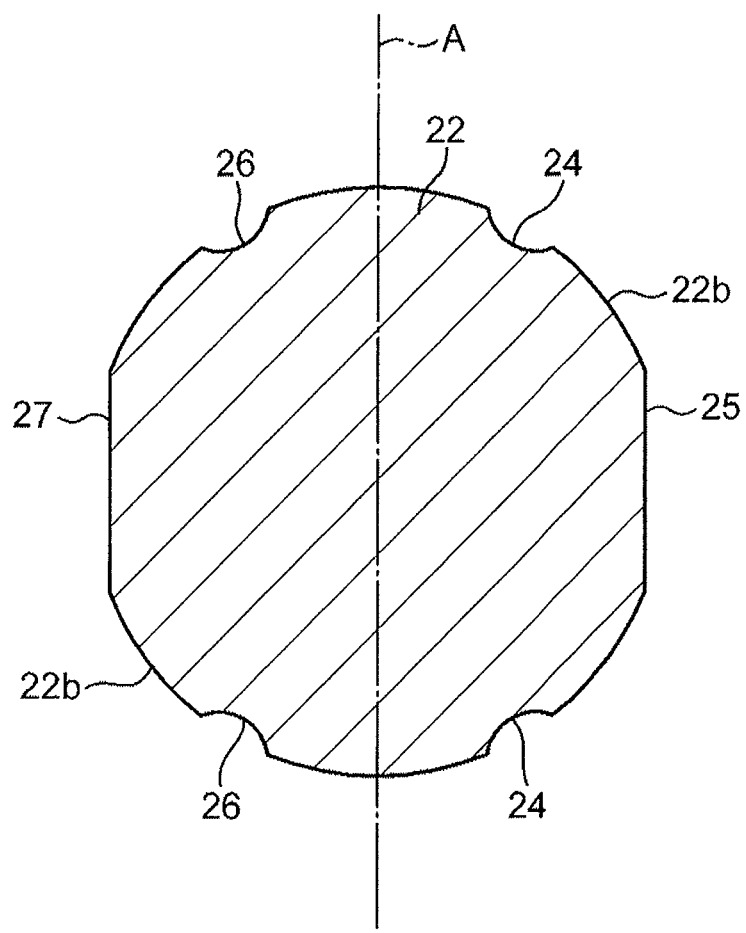
FIG. 3 is a cross-sectional view taken along line III-III of FIG. 2.

As illustrated in FIG. 3, each of the first guide grooves 24 is formed on one side with respect to an axially parallel plane A which includes the center of the shaft part 20 and is parallel to the axial direction. Each of the second guide grooves 26 is formed on the other side with respect to the axially parallel plane A. In the present embodiment, the guide grooves 24, 26 are formed at symmetric positions with respect to the axially parallel plane A as a symmetry plane. Further, the guide grooves 24, 26 are formed in symmetric shapes with respect to the axially parallel plane A as a symmetry plane.

In the present embodiment, a first guide surface 25 and a second guide surface 27 are further formed on the outer peripheral face of the groove forming part 22. The first guide surface 25 is formed on the outer peripheral face of the groove forming part 22 in a region between the two first guide grooves 24. The second guide surface 27 is formed on the outer peripheral face of the groove forming part 22 in a region between the two second guide grooves 26. Each of the guide surfaces 25, 27 extends in the axial direction from the insertion end 22a toward the base end 28a and, is formed in a plane parallel to the axially parallel plane A.

A section of a principal surface 22b of the outer peripheral face of the groove forming part 22 other than the guide grooves 24, 26 and the guide surfaces 25, 27 on a plane perpendicular to the axial direction is formed in a circular arc shape. Specifically, the outer diameter of the principal surface 22b is set to gradually increase from the insertion end 22a toward the base end 28a. In the present embodiment, the outer diameter of the principal surface 22b at the insertion end 22a is set to 0.55 mm. That is, in the present embodiment, the ratio of the depth dimension of each of the first guide grooves 24 to the outer diameter of the principal surface 22b at the insertion end 22a and the ratio of the depth dimension of each of the second guide grooves 26 to the outer diameter of the principal surface 22b at the insertion end 22a are set to 0.07 to 0.09. The ratio is preferably set to 0.018 or more and 0.273 or less. The outer diameter of the principal surface 22b of the groove forming part 22 at an end opposite to the insertion end 22a is set to 1.00 mm.

The held part 28 is a region to be held by a metal mold in a cleaning part forming step described below. The held part 28 has a shape extending from the end opposite to the insertion end 22a in the groove forming part 22 toward the base end 28a. A section of the held part 28 on a plane perpendicular to the axial direction is formed in a circular shape. The outer diameter of the held part 28 is set to gradually increase toward the base end 28a. As illustrated in FIG. 2, the outer diameter of the held part 28 at an end opposite to the base end 28a is set to be larger than the outer diameter of the groove forming part 22 at the end opposite to the insertion end 22a. That is, a step (an end face 28b of the held part 28) is formed on the boundary between the groove forming part 22 and the held part 28. In the present embodiment, the outer diameter of the held part 28 at the end opposite to the base end 28a is set to 1.10 mm.

The grip part 30 extends in the axial direction of the shaft part 20 from the base end 28a to separate from the shaft part 20, and has a flat shape grippable with fingers.

The cleaning part 40 is a region for cleaning an interdental space and formed of a resin material having a hardness lower than the hardness of the base part 10. Specifically, a styrene elastomer is used as the resin material. However, silicone, an olefin elastomer, or a polyester elastomer may be used as the resin material. The cleaning part 40 has a shape covering a region including the insertion end 22a and having a dimension equal to or less than the dimension in the axial direction of the shaft part 20. In the present embodiment, the cleaning part 40 includes a cleaning part body 42 and a plurality of brush bristles 48.

Figure 4:
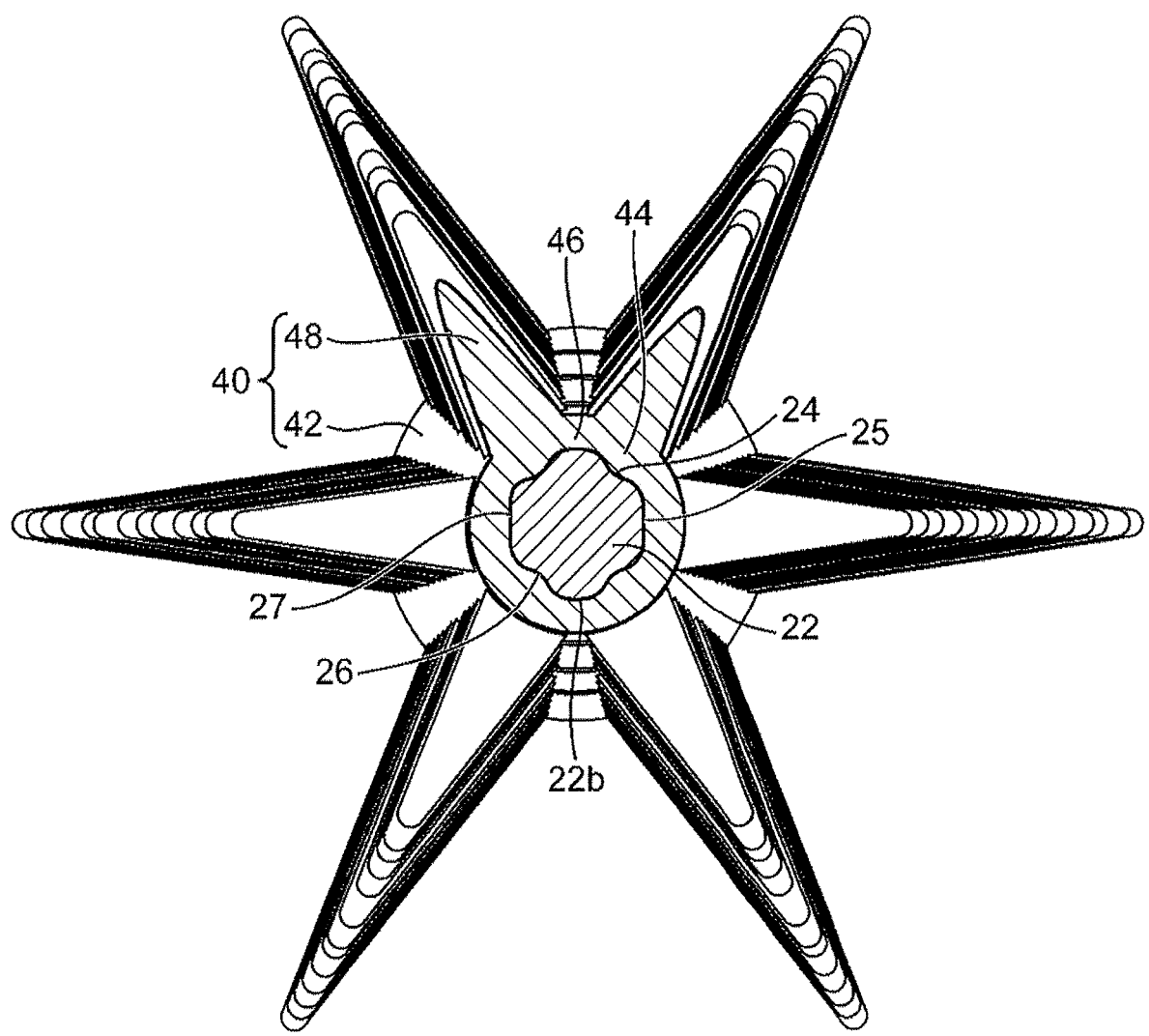
FIG. 4 is a cross-sectional view taken along line IV-IV of FIG. 1.

The cleaning part body 42 has a shape covering the entire outer peripheral face of the groove forming part 22 and a part of the outer peripheral face of the held part 28. A section of the cleaning part body 42 on a plane perpendicular to the axial direction is formed in a circular shape. Specifically, as illustrated in FIG. 4, the section of the cleaning part body 42 on the plane perpendicular to the axial direction is formed in a circle concentric with the section of the principal surface 22b of the groove forming part 22 on the plane perpendicular to the axial direction. That is, the thickness of an overlap part 44 of the cleaning part body 42, the overlap part 44 being a region that overlaps each of the guide grooves 24, 26 and each of the guide surfaces 25, 27 in an axially perpendicular direction perpendicular to the axial direction, is larger than the thickness of a non-overlap part 46 of the cleaning part body 42, the non-overlap part 46 being a region other than the overlap part 44.

Each of the brush bristles 48 projects outward in the axially perpendicular direction from the outer peripheral face of the cleaning part body 42 and has a shape that makes the outer shape of the brush bristle 48 gradually smaller as the distance from the outer peripheral face of the cleaning part body 42 increases. In the present embodiment, each of the brush bristles 48 is formed in a conical shape. As illustrated in FIG. 4, each of the brush bristles 48 is formed at a position that overlaps the overlap part 44 in the axially perpendicular direction. Each of the brush bristles 48 is formed of the same material as the cleaning part body 42 and integrally formed with the cleaning part body 42.

Next, a method for manufacturing the interdental cleaning tool 1 will be described with reference to FIGS. 5 and 6. The manufacturing method includes a base part preparing step of preparing the base part 10 and a cleaning part forming step of forming the cleaning part 40.

In the base part preparing step, the base part 10 is formed by filling a base part forming mold (not illustrated), which has a space having a shape corresponding to the base part 10, with a synthetic resin (polypropylene in the present embodiment). In the present embodiment, a pair of metal molds which is splittable in the axially perpendicular direction along each of the guide surfaces 25, 27 is used as the base part forming mold. The base part forming mold has a filling port through which the synthetic resin can be filled in the direction perpendicular to the grip part 30.

Figure 5:
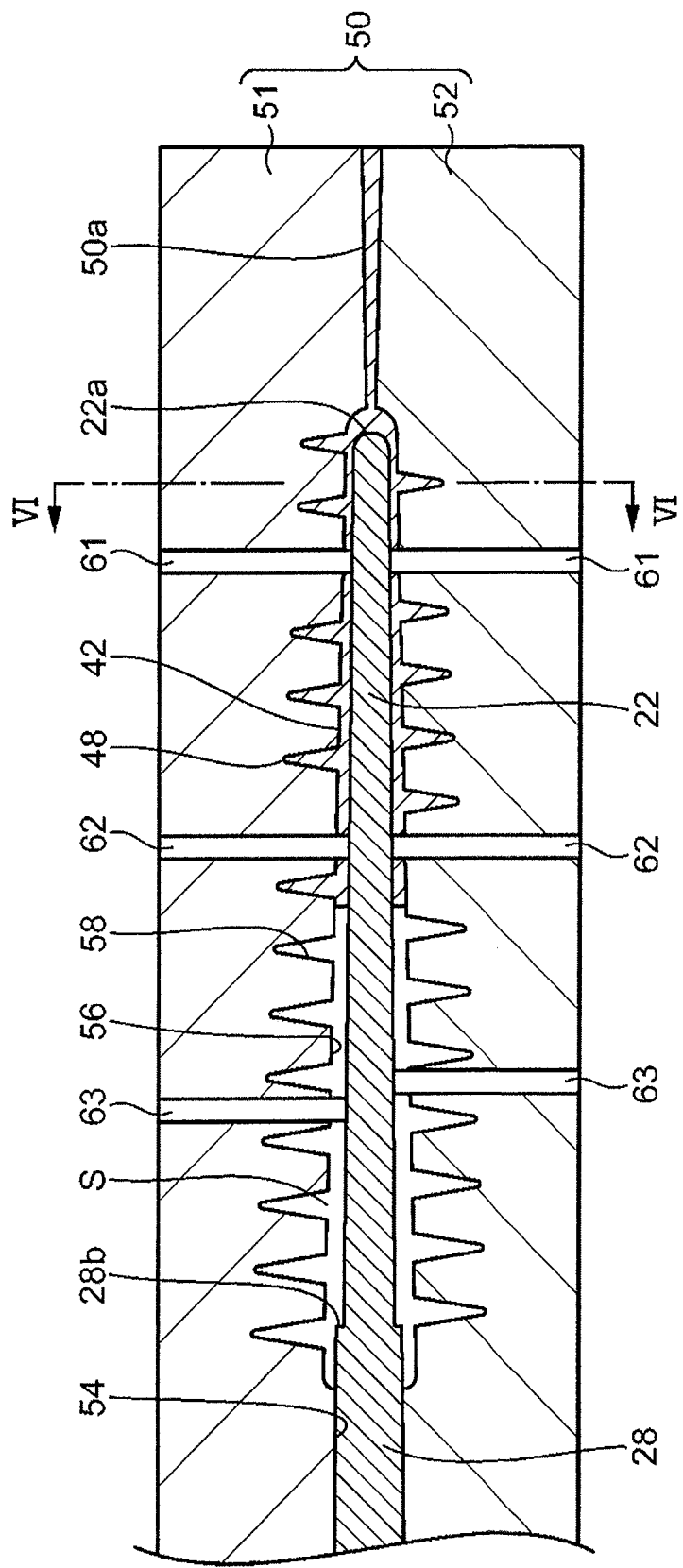
FIG. 5 is a schematic diagram illustrating a step of forming a cleaning part.
Figure 6:
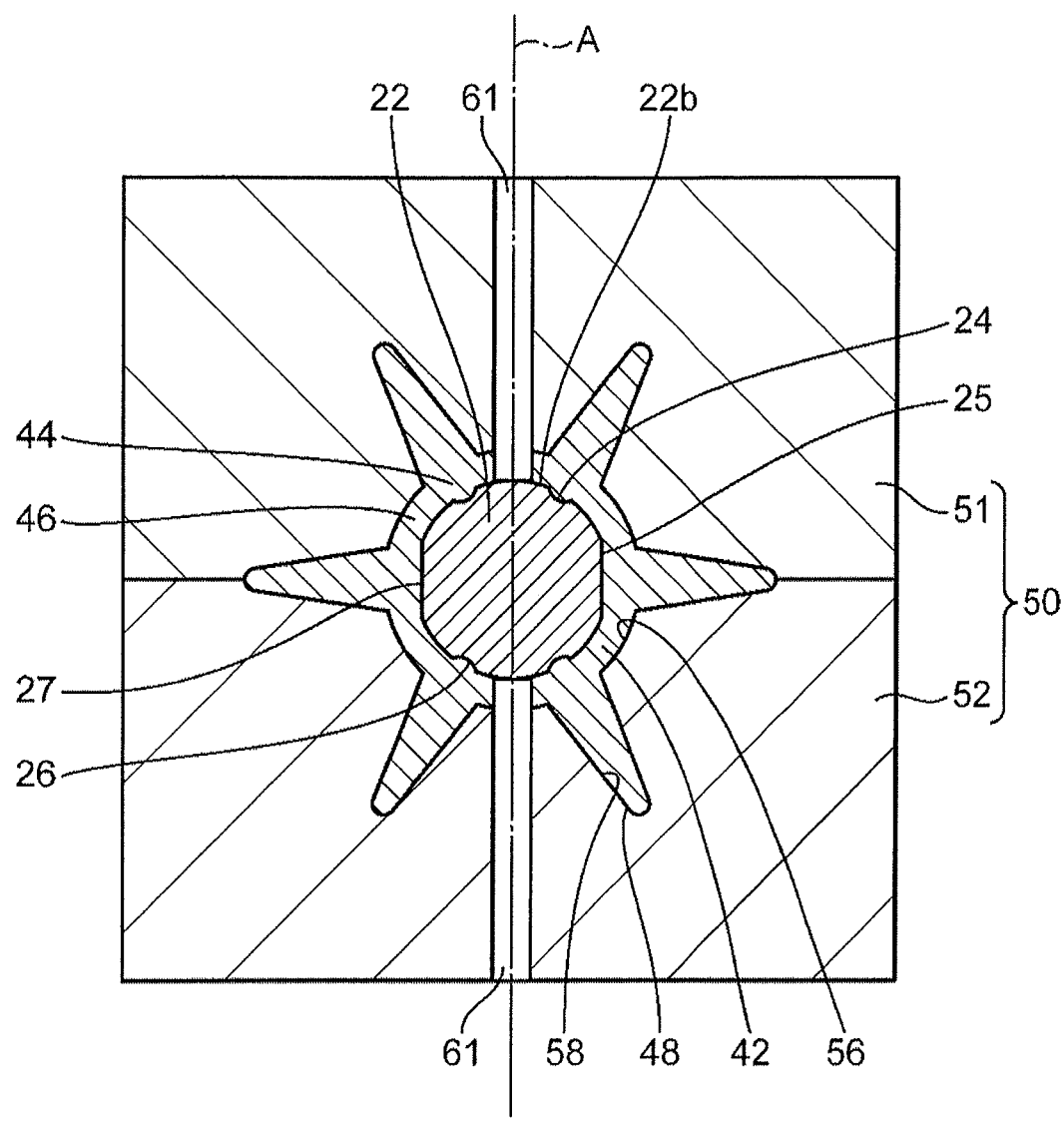
FIG. 6 is a cross-sectional view taken along line VI-VI of FIG. 5.

In the cleaning part forming step following the base part preparing step, as illustrated in FIGS. 5 and 6, a metal mold 50 for forming the cleaning part 40 is used. The interdental cleaning tool 1 does not have a shape in which six brush bristles 48 are arranged in the circumferential direction in a VI-VI section illustrated in FIG. 5. However, FIG. 6 illustrates six brush bristles 48 arranged in the circumferential direction for the purpose of description.

The metal mold 50 includes a first metal mold 51 and a second metal mold 52 which can be separated from and connected to each other. The metal mold 50 includes a holding part 54 which holds the held part 28 of the base part 10 and has a shape that forms a filling space S fillable with a resin material for forming the cleaning part 40 around the shaft part 20 when the holding part 54 holds the held part 28. Specifically, the metal mold 50 includes a cleaning part body forming part 56 which forms the cleaning part body 42 and a brush bristle forming part 58 which forms each of the brush bristles 48. A space defined by the cleaning part body forming part 56, the brush bristle forming part 58, and the outer peripheral face of the shaft part 20 constitutes the filling space S. The metal mold 50 has a filling port 50a for filling the resin material into the filling space S from the insertion end 22a of the shaft part 20 toward the held part 28.

The holding part 54 has a shape capable of holding the held part 28 in a posture in which the brush bristle forming part 58 overlaps each of the guide grooves 24, 26 in the axially perpendicular direction and overlaps each of the guide surfaces 25, 27 in the axially perpendicular direction, and the cleaning part body forming part 56 overlaps the principal surface 22b of the shaft part 20 in the axially perpendicular direction. In other words, as illustrated in FIG. 6, the brush bristle forming part 58 is formed at a position that overlaps each of the guide grooves 24, 26 and each of the guide surfaces 25, 27 in the axially perpendicular direction when the holding part 54 holds the held part 28, and the cleaning part body forming part 56 is formed at a position that overlaps the principal surface 22b in the axially perpendicular direction when the holding part 54 holds the held part 28. The holding part 54 holds the held part 28 in such a manner that each of the guide surfaces 25, 27 is kept in a posture perpendicular to a boundary surface between the first metal mold 51 and the second metal mold 52. As illustrated in FIG. 5, the cleaning part body forming part 56 and the brush bristle forming part 58 have shapes that expand the filling space S from the insertion end 22a toward the base end 28a.

In the present embodiment, a plurality of holding pins 61 to 63 which clamp the groove forming part 22 of the base part 10 held inside the metal mold 50 are used in the cleaning part forming step. The plurality of holding pins include a pair of first holding pins 61, a pair of second holding pins 62, and a pair of third holding pins 63. As illustrated in FIG. 5, the first holding pins 61 clamp a region close to the insertion end 22a in the groove forming part 22. The second holding pins 62 clamp the vicinity of a central part of the groove forming part 22. The third holding pins 63 clamp a region close to the held part 28 in the groove forming part 22. As illustrated in FIG. 6, the first holding pins 61 clamp the groove forming part 22 from both sides in the axially perpendicular direction (an up-down direction in FIG. 6) along the axially parallel plane A. The same applies to the second holding pins 62 and the third holding pins 63. Specifically, the holding pins 61 to 63 clamp a region between the first guide grooves 24 and the second guide grooves 26 on the principal surface 22b of the shaft part 20.

In the cleaning part forming step, a resin material is filled into the filling space S through the filling port 50a in such a manner that the resin material flows along each of the first guide grooves 24 and each of the second guide grooves 26 from the insertion end 22a with a region of the outer peripheral face of the shaft part 20 clamped by the holding pins 61 to 63, the region intersecting the axially parallel plane A, inside the metal mold 50. At this time, in the filling space S, the resin material flows in the axial direction while being guided by each of the first guide grooves 24 on one side (the right side in FIG. 6) with respect to the axially parallel plane A, and the resin material flows in the axial direction while being guided by each of the second guide grooves 26 on the other side (the left side in FIG. 6) with respect to the axially parallel plane A. Thus, a displacement of the resin material in the circumferential direction of the shaft part 20 is prevented at both sides across the axially parallel plane A (each of the holding pins 61 to 63). Thus, a difference between the pressure in a space located on one side with respect to the axially parallel plane A in the filling space S and the pressure in a space located on the other side with respect to the axially parallel plane A in the filling space S is less likely to occur, and accordingly, bending of the shaft part 20 during the filling of the resin material is prevented. Thus, formation of the cleaning part 40 having a nonuniform thickness (a molding failure of the interdental cleaning tool 1) is prevented, which improves yields.

Further, in the cleaning part forming step, the resin material flows in the axial direction while being guided also by each of the guide surfaces 25, 27. Thus, bending of the shaft part 20 during the filling of the resin material is more reliably prevented.

Further, the first guide grooves 24 and the second guide grooves 26 are formed at the symmetric positions with respect to the axially parallel plane A as a symmetry plane. Thus, a pressure is uniformly applied to the shaft part 20 (the groove forming part 22) from the resin material in a direction perpendicular to an application direction of the clamping force to the shaft part 20 by each of the holding pins 61 to 63. Thus, it is possible to more reliably prevent bending of the shaft part 20.

Further, in the present embodiment, the ratio of the depth dimension of each of the first guide grooves 24 to the outer diameter of the principal surface 22b at the insertion end 22a and the ratio of the depth dimension of each of the second guide grooves 26 to the outer diameter of the principal surface 22b at the insertion end 22a are set to 0.07 to 0.09. Thus, it is possible to make effective guiding of the resin material along each of the guide grooves 24, 26 compatible with ensuring of the strength of the shaft part 20. Specifically, the displacement of the resin material in the circumferential direction when the resin material comes into contact with the insertion end 22a is sufficiently restricted by setting the ratios to 0.07 to 0.09. Thus, the resin material is effectively guided along each of the guide grooves 24, 26. Further, the cross-sectional area of the shaft part 20, that is, the strength of the shaft part 20 is sufficiently ensured by setting the ratios to 0.07 to 0.09. Further, the dimension in the circumferential direction of the principal surface 22b is sufficiently ensured by setting the ratios to 0.07 to 0.09. Thus, it is possible to stably clamp the groove forming part 22 by the holding pins 61 to 63.

Each of the guide grooves 24, 26 has a curved shape projecting toward the center of the shaft part 20. Thus, it is possible to more reliably prevent the occurrence of the pressure difference. Specifically, due to the curved shape of each of the guide grooves 24, 26, the occurrence of entrapped air in each of the guide grooves 24, 26 during the filling of the resin material is reduced compared to a case in which each of the guide grooves 24, 26 has a corner. Thus, the occurrence of the pressure difference caused by the occurrence of entrapped air is prevented, which prevents bending of the shaft part 20.

Further, the held part 28 has an outer diameter larger than the outer diameter of the groove forming part 22. In the cleaning part forming step, the resin material is filled in a state that the held part 28 is held by the holding part 54 of the metal mold 50. Thus, it is possible to prevent a thin film from being formed on the shaft part 20 after the filling of the resin material while preventing bending of the shaft part 20 during the filling of the resin material. Specifically, when the resin material is filled in a state that the held part 28 is held by the metal mold 50, the resin material is received by the boundary (the end face 28*b* of the held part 28) between the groove forming part 22 and the held part 28. Thus, it is possible to prevent a thin film made of the resin material from being formed on the shaft part 20 due to leakage of the resin material toward the base end 28*a* through a gap between the metal mold 50 and the outer peripheral face of the held part 28.

Further, in the cleaning part forming step of the present embodiment, the metal mold 50 has the shape that expands the filling space S from the insertion end 22*a* toward the base end 28*a*. Thus, the pressure applied to the shaft part 20 from the resin material filled in the filling space S in the direction perpendicular to the application direction of the clamping force by each of the holding pins 61 to 63 gradually decreases from the insertion end 22*a* toward the base end 28*a*. Thus, bending of the shaft part 20 during the filling of the resin material in the cleaning part forming step is more reliably prevented.

Further, in the interdental cleaning tool 1 manufactured through the cleaning part forming step, each of the brush bristles 48 is formed at the position that overlaps the overlap part 44 in the axially perpendicular direction. Thus, it is possible to effectively clean an interdental space while ensuring the insertability of the cleaning part 40 into the interdental space. Specifically, since each of the brush bristles 48 is formed at the position that overlaps the overlap part 44 in the axially perpendicular direction, in other words, the thickness of the overlap part 44 which corresponds to a region supporting each of the brush bristles 48 is sufficiently large, each of the brush bristles 48 is easily elastically deformed. Thus, it is possible to effectively clean an interdental space while ensuring the insertability of the cleaning part 40 into the interdental space.

It is to be understood that the presently disclosed embodiment is exemplary rather than restrictive in all the aspects thereof. The scope of the present invention is represented by the claims, rather than by the description of the embodiment described hereinabove, and further includes all modifications in meanings and scopes equivalent to those of the claims.

For example, although, in the above embodiment, there has been described an example in which the two first guide grooves 24 and the two second guide grooves 26 are formed, the number of guide grooves 24, 26 is not limited two. Further, each of the guide surfaces 25, 27 may be omitted, that is, a region of each of the guide surfaces 25, 27 may constitute a part of the principal surface 22*b*. In this case, each of the guide grooves 24, 26 may be additionally formed on the region.

Further, although, in the above embodiment, there has been described an example in which a starting point of each of the guide grooves 24, 26 corresponds to the insertion end 22*a*, and an end point of each of the guide grooves 24, 26 corresponds to the end face 28*b* of the held part 28, the end point of each of the guide grooves 24, 26 may be set at any position in the groove forming part 22 between a region clamped by the first holding pins 61 and the end face 28*b* of the held part 28.

EXAMPLES

For the interdental cleaning tool 1 of the above embodiment, one hundred and sixty types of examples were created. Specifically, thirty-two types of first examples in which no inorganic substance is added to the synthetic resin that forms the base part 10 and one hundred and twenty-eight types of second examples in which an inorganic substance is added to the synthetic resin that forms the base part 10 were created. Each of the examples was created in the following manner.

First Examples

The thirty-two types of first examples were created by combinations of four resin materials: a styrene elastomer having a Shore A hardness of 30; an olefin elastomer having a Shore A hardness of 50; a polyester elastomer having a Shore A hardness of 50; and a silicone having a Shore A hardness of 30 as the resin material that forms the cleaning part 40 with eight synthetic resins: polypropylene; polyethylene; ABS; polybutylene terephthalate; polycarbonate; polyethylene terephthalate; polystyrene; and polyacetal as the synthetic resin that forms the base part 10.

Second Examples

The one hundred and twenty-eight types of second examples were created by combinations of thirty-two types of base parts 10 formed by adding one of four inorganic substances: glass fiber; carbon fiber; talc; and calcium carbonate to each of the above eight synthetic resins that forms the base part 10 with four types of cleaning parts 40 made of the above four resin materials. Here, glass fiber was added to the synthetic resin in such a manner that the amount of glass fiber contained in the base part 10 was 33%. Carbon fiber was added to the synthetic resin in such a manner that the amount of carbon fiber contained in the base part 10 was 28%. Talc was added to the synthetic resin in such a manner that the amount of talc contained in the base part 10 was 25%. Calcium carbonate was added to the synthetic resin in such a manner that the amount of calcium carbonate contained in the base part 10 was 35%.

It has been confirmed that, in all of the above one hundred and sixty types of examples in total, bending of the shaft part 20 during filling of the resin material into the metal mold 50 is prevented, and the yields are improved compared to the case in which a shaft part that does not include the guide grooves 24, 26 is used.

REFERENCE SIGNS

1 interdental cleaning tool
10 base part
20 shaft part
22 groove forming part
22*a* insertion end
24 first guide groove
25 first guide surface
26 second guide groove
27 second guide surface
28 held part
28*a* base end
30 grip part
40 cleaning part
42 cleaning part body
44 overlap part
46 non-overlap part
48 brush bristle
50 metal mold
54 holding part
56 cleaning part body forming part 58 brush bristle forming part
61 holding pin
62 holding pin
63 holding pin
A axially parallel plane
S filling space

The invention claimed is:

1. An interdental cleaning tool comprising:
a base part including:
   a shaft part extending in a specific direction and having a shape insertable into an interdental space, the shaft part having an insertion end formed on one end in the specific direction and a base end formed on the other end in the specific direction; and
   a grip part extending in the specific direction from the base end in a manner to separate from the shaft part and having a shape grippable with fingers,
a cleaning part around the shaft part and,
wherein the shaft part includes a groove forming part having a first guide groove formed on one side with respect to an axially parallel plane, the axially parallel plane including a center of the shaft part and being parallel to the specific direction, and a second guide groove formed on the other side with respect to the axially parallel plane, and
the first guide groove and the second guide groove extend in an axial direction of the shaft part from the insertion end toward the base end and have a shape recessed toward the center of the shaft part from an outer peripheral surface of a region other than the first guide groove and the second guide groove in the shaft part,
wherein the cleaning part includes a cleaning part body covering an outer peripheral surface of the groove forming part from the insertion end, and brush bristles each having a shape projecting outward in an axially perpendicular direction perpendicularly intersecting the axial direction of the shaft part from an outer peripheral surface of the cleaning part body, and
wherein a radial thickness of the cleaning part body is larger in a portion corresponding to the brush bristle than in a portion corresponding to a space between the adjacent brush bristles.

2. The interdental cleaning tool according to claim 1, wherein
the first guide groove and the second guide groove are formed at symmetric positions with respect to the axially parallel plane as a symmetry plane.

3. The interdental cleaning tool according to claim 1, wherein
a ratio of a depth dimension of the first guide groove to an outer diameter of the insertion end and a ratio of a depth dimension of the second guide groove to the outer diameter of the insertion end are set to 0.018 or more and 0.273 or less.

4. The interdental cleaning tool according to claim 1, wherein
the first guide groove and the second guide groove have a curved shape projecting toward the center of the shaft part.

5. The interdental cleaning tool according to claim 1, wherein
the shaft part includes a held part to be held by a metal mold having a shape that forms a filling space fillable with a resin material for forming the cleaning part, the held part extending toward the base end from the groove forming part, and
the held part has an outer diameter larger than an outer diameter of the groove forming part.

6. The interdental cleaning tool according to claim 5:
wherein the cleaning part is formed of a material, as the resin material, having a hardness lower than a hardness of the shaft part and has a shape covering an outer peripheral surface of a region including the insertion end and having a dimension equal to or less than a dimension in the axial direction of the shaft part.

7. The interdental cleaning tool according to claim 1, wherein
the cleaning part body includes a circular section on a plane perpendicularly intersecting to the axial direction.

\* \* \* \* \*